July 19, 1932. F. RICHARDS 1,867,760
TRUCK HOIST
Filed July 8, 1930 3 Sheets-Sheet 1
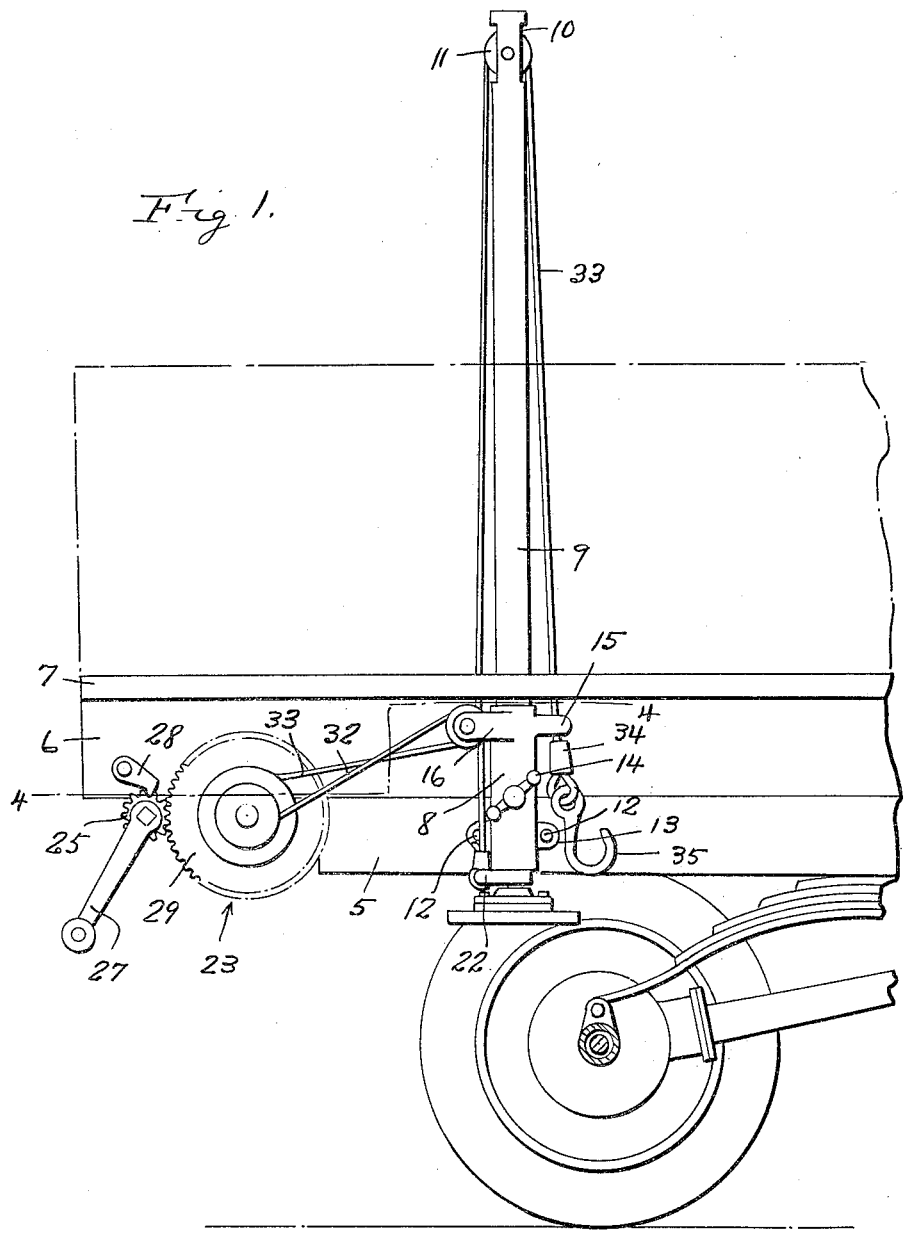
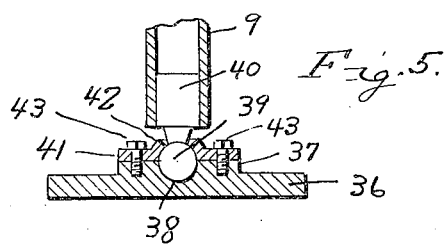
Inventor
Franco Richards
By Clarence A. O'Brien
Attorney July 19, 1932.  F. RICHARDS  1,867,760
TRUCK HOIST
Filed July 8, 1930   3 Sheets-Sheet 2
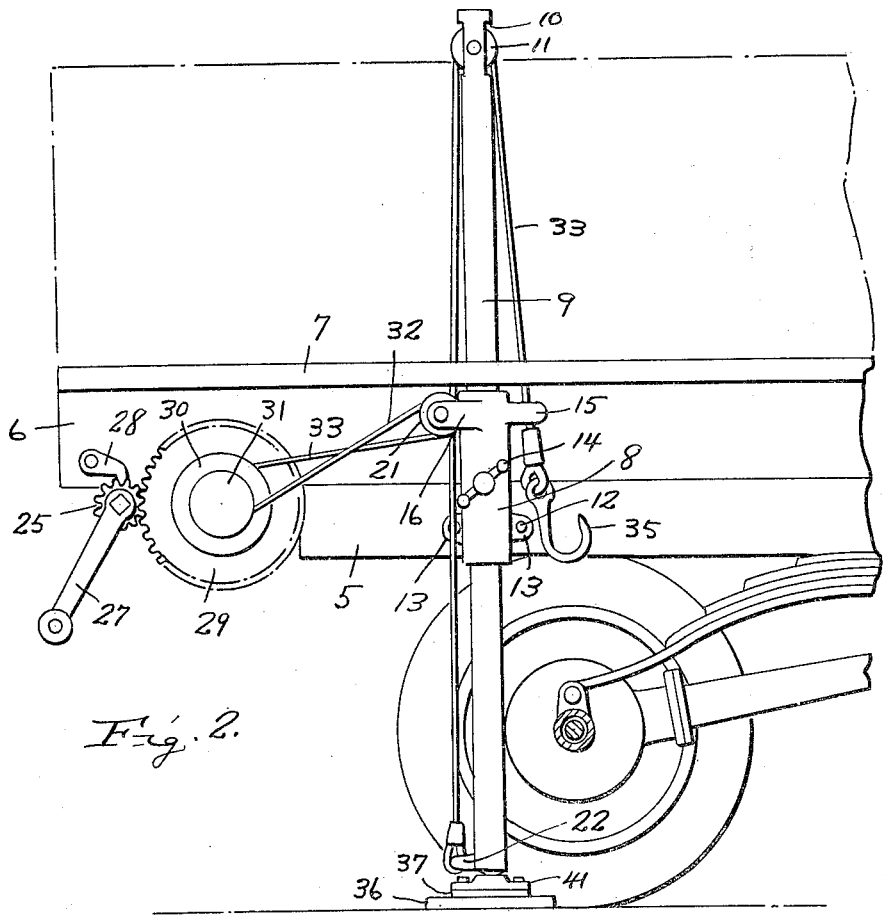
Fig. 2.
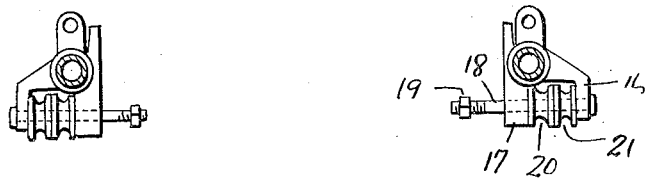
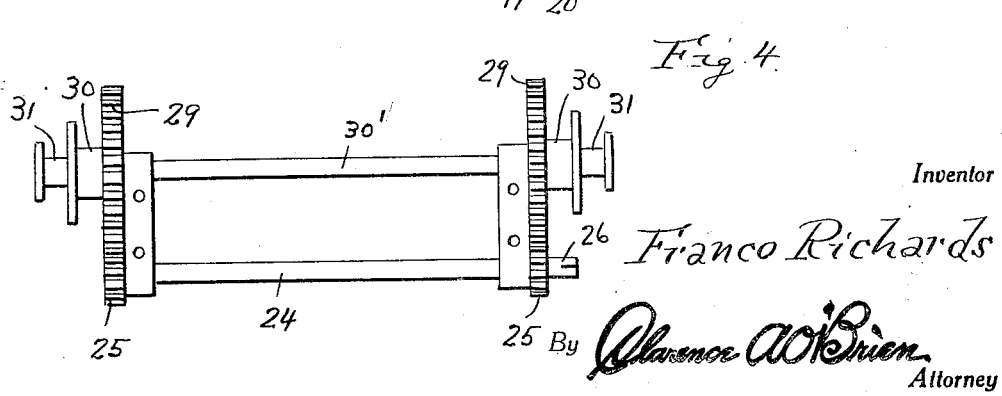
Fig. 4.
Inventor
Franco Richards
By Clarence A. O'Brien
Attorney

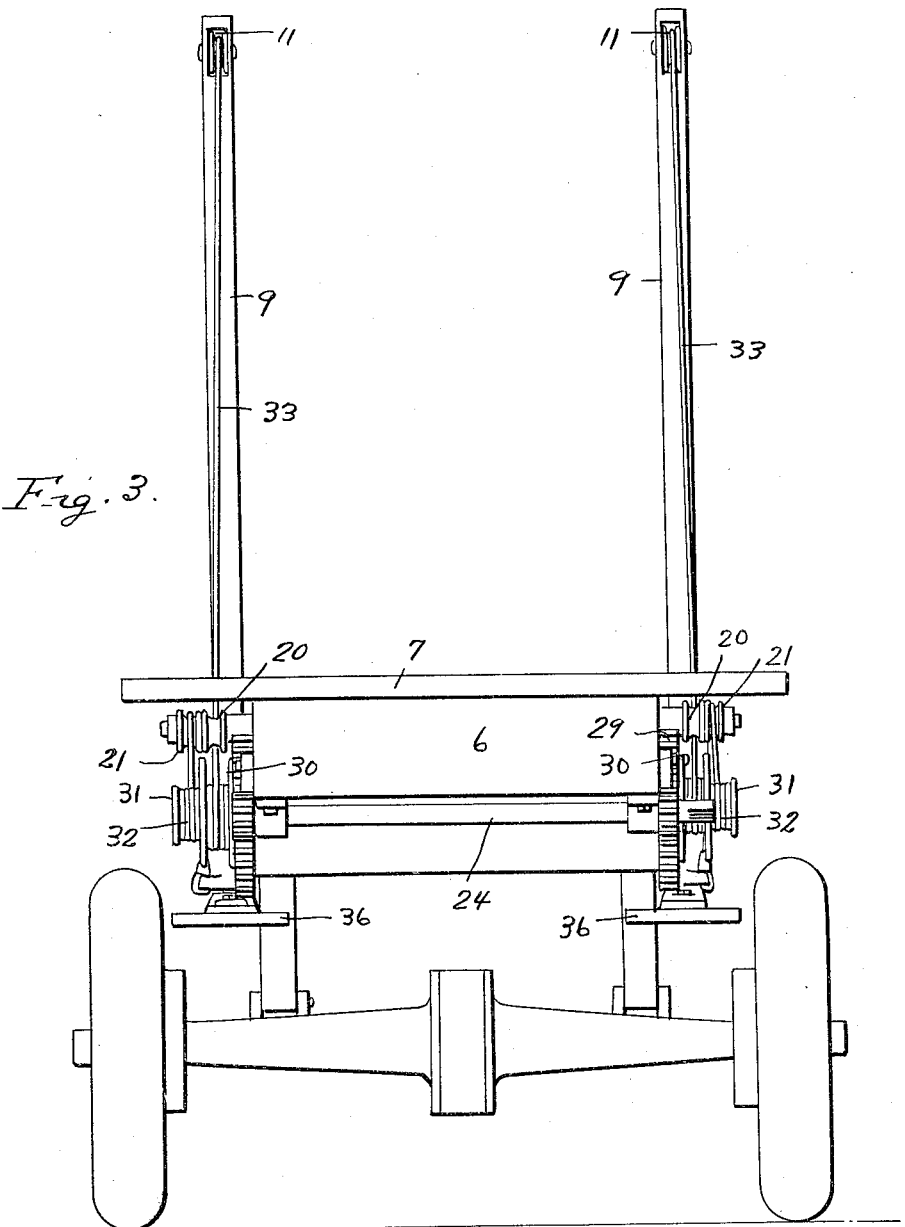

Patented July 19, 1932

1,867,760

UNITED STATES PATENT OFFICE

FRANCO RICHARDS, OF PIPECREEK, TEXAS

TRUCK HOIST

Application filed July 8, 1930. Serial No. 466,501.

This invention relates to new and useful improvements in hoists for trucks, and relates more particularly to a novel hoisting means adapted to be carried on the truck to facilitate the removal of the truck from mud and also to serve as a jack in elevating the truck and wheels to permit repair or replacement of parts.

The principal object of the invention is to provide a truck hoist capable of being actuated with ease.

Another important object of the invention is to provide a truck hoist which will not be cumbersome, nor obstructive to the use of the truck.

Other objects and advantages of the invention will become apparent to the reader of the following specification and claims.

In the drawings:—

Figure 1 represents a fragmentary side elevational view of the rear end of a truck equipped with the novel hoist.

Fig. 2 represents a view similar to that shown in Fig. 1, but showing the hoist in ground engaged position.

Fig. 3 represents a rear elevational view of the truck showing a pair of the hoisting units mounted on the truck.

Fig. 4 represents a horizontal sectional view taken substantially on the line 4—4 of Fig. 1.

Fig. 5 represents a fragmentary sectional view through the ground engaging plate of the hoist.

Referring to the drawings wherein like numerals designate like parts, it can be seen that numeral 5 represents the truck chassis on which the body frame 6 is mounted. Numeral 7 represents the floor of the truck body. As is apparent in Fig. 3, a pair of the hoisting units are employed at the rear end of the truck, and each includes a barrel 8 through which the vertical shaft 9 is slidable. This shaft may be hollow if desired, and is provided at its upper edge with an opening 10 therethrough within which the pulley 11 is mounted. The barrel 8 is alined with an opening in the overhanging portion of the floor 7, and through this opening (not shown), the shaft 9 is slidable.

The barrel 8 is to be secured to the chassis 5 by elements 12 passing through the ears 13 on the barrel and into the chassis 5. A hand screw 14 is employed and adapted to be driven through the barrel 8 to bite into the shaft 9 to maintain the same in adjusted position.

As is clearly shown in Figs. 1 and 2, the upper end of the barrel 8 is provided with an eye 15 and brackets 16—17. A bolt 18 extends through the ends of these brackets and is to be disposed through an opening in the truck frame 6 to supplement the fastening of the barrel to the truck. A nut 19 is engaged on the bolt and against the inner side of the frame, to prevent displacement of the bolt. A pair of pulleys 20 and 21 are located on the bolt 18 between the brackets 16 and 17. An eye 22 is located at the lower end of the shaft 9.

A winch arrangement is generally referred to by numeral 23 and includes a shaft 24 which is supported beneath the rear end of the frame 6 and carries a pinion 25 adjacent each end thereof, one end of the shaft extending beyond one of the pinions, and being of polygonal shape as shown by numeral 26 for engagement with a socketed crank 27. (See Fig. 1.)

A dog 28 is engageable with each of the pinions 25 and these pinions are always in mesh with the gears 29 on the shaft 30' which shaft is substantially parallel with and disposed beneath the rear end portion of the frame 6, slightly forwardly of the shaft 24. Each end of the shaft 30' outwardly of its gear 29, is provided with a relatively large drum 30 and a smaller drum 31. A cable 32 connects to the small drum at each side of the truck and is trained over the pulley 21 and connected to the eye 22 at the lower end of the shaft 9.

A second cable 33 at each side of the truck connects at one end to the drum 30 and is trained under the pulley 20 and extends upwardly for disposition over the upper pulley 11 on the shaft 9 and downwardly through the eye 15, the block 34 on the cable 33 serving to prevent the cable end from pulling through the eye 15. This last-mentioned end of the cable 33 is provided with a hook 35 which can be engaged under the rear axle of the truck when it is desired to repair tires and other parts of the wheels.

A ground engaging plate 36 is provided with a central portion 37. This portion 37 has a depression 38 therein to receive the ball 39 on the plug 40, which plug is secured within the lower end of the shaft 9. A plate 41 has a concaved portion 42 for receiving the upper portion of the ball 49, and this plate 41 is to be secured to the top of the raised portion 37 by a screw 43.

Thus, the base plate 36 will engage a wide area on the ground and will accommodate itself to unlevel ground by reason of the ball and socket connection between the plate 36 and the shaft 9. On the plate considerable leverage can be obtained through the peculiar arrangement of cables and drum. With the use of this device, trucks may be easily lifted from mud holes, and furthermore, such hoist units will be exceedingly useful in permitting the quick changing of tires and repairs to the rear wheels.

While the foregoing specification sets forth the invention in definite terms, it is to be understood that numerous changes in the shape, size and materials may be resorted to without departing from the spirit and scope of the invention as claimed hereinafter.

Having thus described my invention, what I claim as new is:—

1. In combination with a truck a vertically arranged barrel, located at each side of the truck body, a vertically arranged rod sliding through each barrel, a plate connected to the lower end of each rod, a pulley at the upper end of each rod, an eye formed on the front part of each barrel, a pulley carried by the rear part of each barrel, a shaft rotatably supported at the rear end of the body, a pair of drums connected to each end of the shaft, a cable connected to one drum of each pair and passing over the pulley at the upper end of each rod and then downwardly through the eye on each barrel, a stop on the end of the cable engaging the bottom part of the eye, a cable on the other drum of each pair and passing over the pulley carried by each barrel and having its other end connected to the lower end of each rod, the cables of one set being wound on their drum in an opposite direction from the cables of the other set, and means for rotating the shaft to slack one set of cables, and exert a pull on the other set whereby the rods may be moved vertically.

2. In combination with a truck, a vertically arranged barrel, connected to the rear part thereof, a rod passing through the barrel, a pulley at the upper end of the rod, a plate supported for rocking movement at the lower end of the rod, an eye formed at the front side of the barrel, a pulley carried by the rear side thereof, a screw member passing through the barrel and adapted to engage the rod for holding the rod in adjusted position, a pair of drums carried by the truck, a cable connected with one drum and passing over the pulley at the top of the rod and then downwardly through the eye, a member connected to the cable below the eye, and a cable on the second drum passing through the pulley on the barrel and having its lower end connected with the lower end of the rod, and means for rotating the drums in unison.

In testimony whereof I affix my signature.

FRANCO RICHARDS.